US011062041B2

(12) United States Patent
Kludy

(10) Patent No.: US 11,062,041 B2
(45) Date of Patent: Jul. 13, 2021

(54) SCRUBBING LOG FILES USING SCRUBBING ENGINES

(71) Applicant: Citrix Systems, Inc., Fort Lauderdale, FL (US)

(72) Inventor: Thomas Michael Kludy, Cooper City, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 14 days.

(21) Appl. No.: 15/661,740

(22) Filed: Jul. 27, 2017

(65) Prior Publication Data

US 2019/0034652 A1 Jan. 31, 2019

(51) Int. Cl.
*G06F 21/62* (2013.01)

(52) U.S. Cl.
CPC ...... *G06F 21/6218* (2013.01); *G06F 21/6245* (2013.01); *G06F 2221/2101* (2013.01); *G06F 2221/2143* (2013.01)

(58) Field of Classification Search
CPC ............ G06F 21/6218; G06F 21/6245; G06F 2221/2143
USPC ......................................................... 726/26
See application file for complete search history.

(56) References Cited

U.S. PATENT DOCUMENTS

| | | | | | |
|---|---|---|---|---|---|
| 7,818,809 | B1* | 10/2010 | Sobel | ................... | G06Q 30/00 726/26 |
| 8,601,565 | B1* | 12/2013 | Sakata | ................... | G06F 21/606 726/11 |
| 8,688,700 | B2* | 4/2014 | Fallen | ................. | H04L 41/0681 707/736 |
| 8,914,736 | B2* | 12/2014 | Cardasco | ............. | G06F 16/958 715/760 |
| 9,552,272 | B1* | 1/2017 | Liang | .................. | G06F 11/0778 |
| 9,582,680 | B2* | 2/2017 | Bilodeau | ............. | G06F 16/9535 |
| 2003/0182562 | A1* | 9/2003 | Liardet | ................... | G11C 16/22 713/189 |
| 2006/0225142 | A1* | 10/2006 | Moon | ..................... | G06F 21/79 726/34 |
| 2006/0238919 | A1* | 10/2006 | Bradley | ................ | G06F 16/215 360/128 |
| 2010/0058480 | A1* | 3/2010 | Hedberg | ............. | A61B 5/6843 726/26 |
| 2010/0241844 | A1* | 9/2010 | Hussain | ................ | H04L 63/105 713/150 |

(Continued)

*Primary Examiner* — Badri Champakesan
(74) *Attorney, Agent, or Firm* — Banner & Witcoff, Ltd.

(57) ABSTRACT

Methods and systems for scrubbing log files using scrubbing engines are described herein. For example, a local scrubbing server may receive a plurality of log messages from an application executing on a cloud server. Then, the local scrubbing server may store the plurality of log messages in an in-memory queue of the cloud server. After, the local scrubbing server may scrub a log message from the in-memory queue based on determining whether the log message satisfies criteria information. Further, the local scrubbing server may transmit, to a central service computing platform, the log message. Subsequently, the central service computing platform may receive, from the local scrubbing server, the log message. Additionally, the central service computing platform may perform a second review of the log message. Then, the central service computing platform may transmit, to a third party logging service, the log message.

20 Claims, 15 Drawing Sheets

(56) References Cited

U.S. PATENT DOCUMENTS

| | | | | |
|---|---|---|---|---|
| 2011/0239113 | A1* | 9/2011 | Hung | G16H 10/60 |
| | | | | 715/271 |
| 2014/0129226 | A1* | 5/2014 | Lee | G10L 15/04 |
| | | | | 704/254 |
| 2014/0280197 | A1* | 9/2014 | Gatto | G06F 17/40 |
| | | | | 707/741 |
| 2014/0337988 | A1* | 11/2014 | Gandhi | G06F 16/21 |
| | | | | 726/26 |
| 2016/0034705 | A1* | 2/2016 | Horvitz | H04W 12/02 |
| | | | | 726/26 |
| 2016/0203336 | A1* | 7/2016 | Nambiar | G06F 21/6245 |
| | | | | 726/26 |
| 2016/0364573 | A1* | 12/2016 | Chan | G06F 21/6218 |
| 2017/0147828 | A1* | 5/2017 | Kurian | G06F 21/6218 |
| 2017/0149793 | A1* | 5/2017 | Spertus | H04L 41/069 |
| 2017/0200122 | A1* | 7/2017 | Edson | H04L 63/104 |
| 2018/0027006 | A1* | 1/2018 | Zimmermann | H04L 63/0245 |
| | | | | 726/11 |
| 2018/0032753 | A1* | 2/2018 | Cai | H04L 63/1408 |
| 2018/0046608 | A1* | 2/2018 | Yousaf | G06F 3/14 |
| 2018/0097829 | A1* | 4/2018 | Muttik | G06F 21/629 |
| 2018/0285590 | A1* | 10/2018 | Cosson | G06F 21/6245 |
| 2018/0285596 | A1* | 10/2018 | Jones | G06F 21/552 |

* cited by examiner

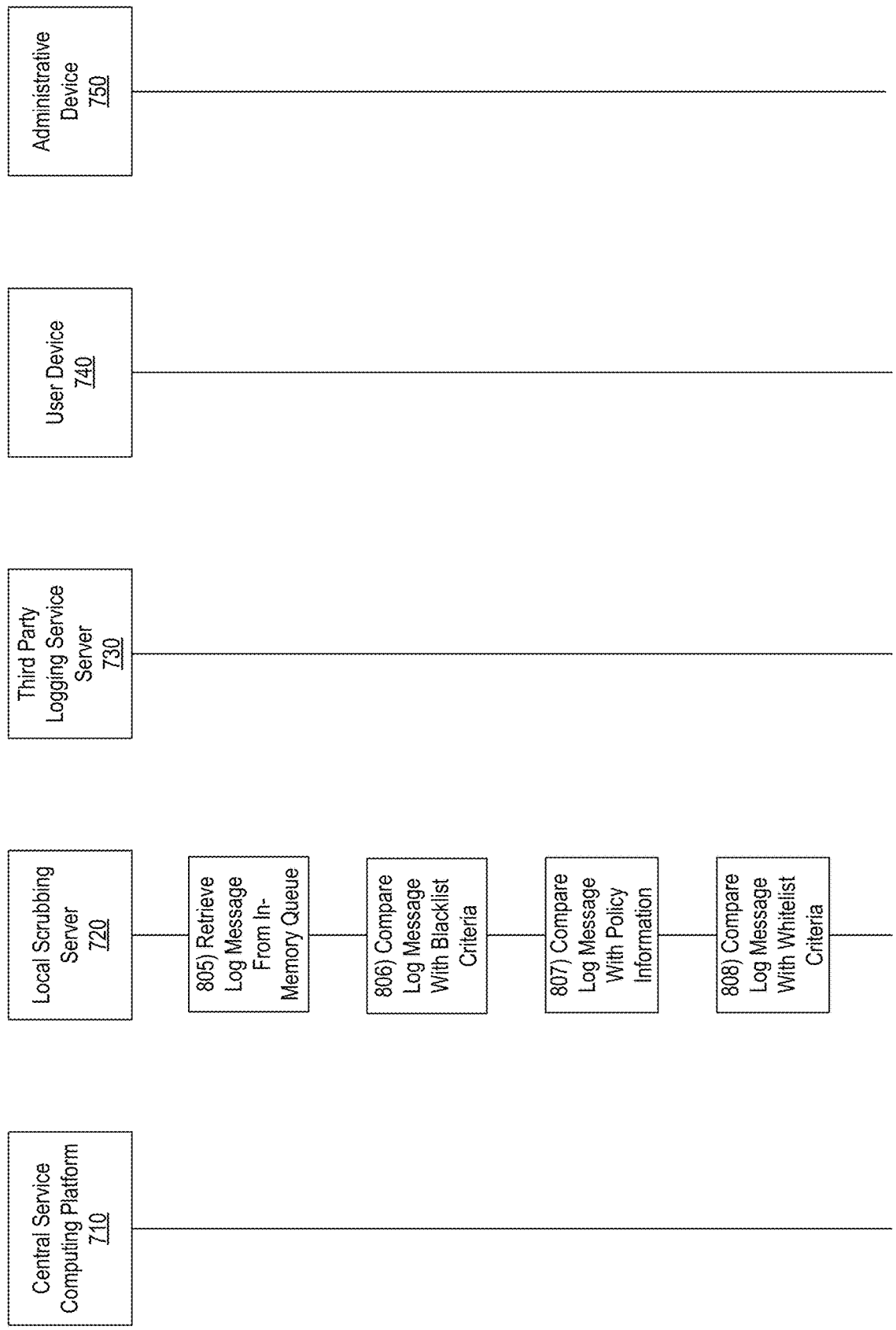

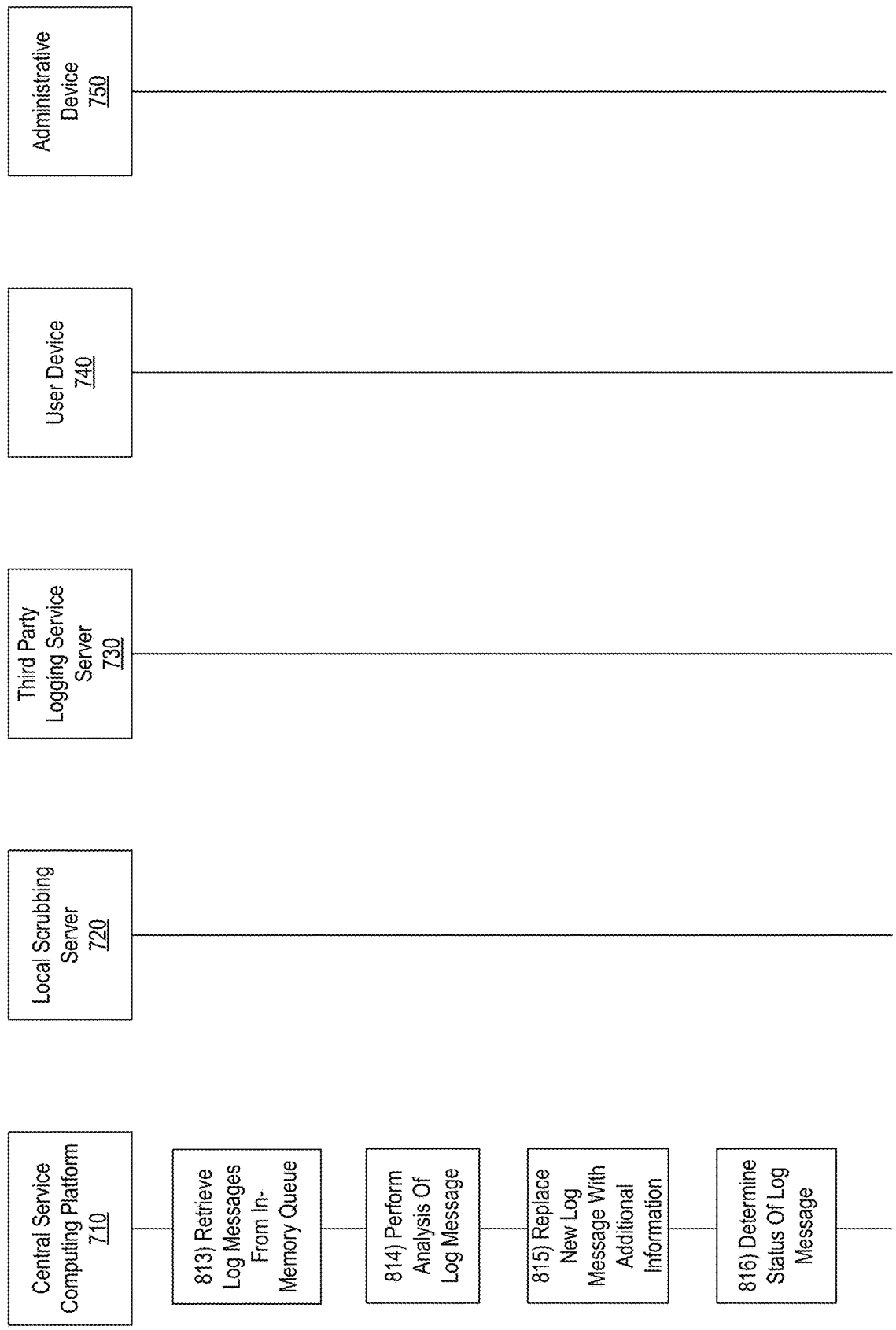

SCRUBBING LOG FILES USING SCRUBBING ENGINES

FIELD

Aspects described herein generally relate to computer hardware and software, digital processing systems, and multicomputer data transfer. In particular, one or more aspects of the disclosure relate to computer hardware and software for scrubbing log files using scrubbing engines.

BACKGROUND

Enterprise organizations may use log files to detect, analyze, and troubleshoot problems within software applications. However, as software applications become more complicated, the log files associated with the software applications may become more difficult to manage. For example, enterprise organizations might not be able to maintain the numerous log files associated with different software applications managed by the organization. Hence, the organization may need to transfer log files to a third party logging service. However, some log files may contain sensitive and confidential information. Thus, by transferring the log files to the third parties, the organization may also transfer sensitive and confidential information within the log files. In some instances, this may present technical challenges.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards scrubbing log files using scrubbing engines.

In accordance with one or more embodiments, a computing platform having at least one processor, memory, and a communication interface may generate, by the at least one processor, one or more commands directing a local scrubbing server to scrub a plurality of log messages. Subsequently, the computing platform may transmit, by the at least one processor, via the communication interface, and to the local scrubbing server, the one or more commands directing the local scrubbing server to scrub the plurality of log messages. Thereafter, the computing platform may receive, by the at least one processor, via the communication interface, and from the local scrubbing server, a log message from the plurality of log messages, wherein the log message was scrubbed based on the one or more commands In addition, the computing platform may perform, by the at least one processor, a second analysis of the log message. Further, the computing platform may transmit, by the at least one processor, via the communication interface, to a third party logging service server, and based on the second analysis, the log message.

In some instances, the computing platform may generate the one or more commands directing the local scrubbing server to scrub the plurality of log messages by retrieving the log message from an in-memory queue storing the plurality of log messages. Further, in response to determining that the log message comprises criteria information, the computing platform may scrub the log message based on the criteria information. Additionally, the computing platform may transmit, to the computing platform, the log message.

In some embodiments, the computing platform may generate the one or more commands directing the local scrubbing server to scrub the plurality of log messages by storing, using a first thread of execution, the log message at a tail end of the in-memory queue. Further, the in-memory queue may comprise the tail end and a head end, and the log message may move from the tail end to the head end as new log messages are received by the local scrubbing server. Further, the storing the log message at the tail end of the in-memory queue may be in response to receiving the log message. Subsequently, the retrieving the log message from the in-memory queue may comprise retrieving, using a second thread of execution, the log message from the head end of the in-memory queue.

In some instances, the scrubbing the log message based on the criteria information may comprise removing, based on the criteria information, sensitive information from the log message. Subsequently, the transmitting the log message may comprise transmitting the log message with the sensitive information removed from the log message. In some embodiments, the scrubbing the log message based on the criteria information may comprise replacing, based on the criteria information, the log message with a new log message, comprising identification information associated with the log message. Further, the transmitting the log message may comprise transmitting the new log message.

In some examples, the computing platform may generate the one or more commands directing the local scrubbing server to scrub the plurality of log messages by replacing the log message with a new log message indicating the memory resources of the in-memory queue are exhausted. Additionally, the replacing the log message with a new log message may be in response to determining memory resources of the in-memory queue are exhausted. In some instances, the computing platform may perform the second analysis of the plurality of scrubbed log messages by receiving, by the at least one processor, via the communication interface, and from an administrative device, blacklist information. Subsequently, in response to determining the log message comprises blacklist information, the computing platform may remove the blacklist information from the log message.

In some embodiments, the computing platform may perform the second analysis of the plurality of scrubbed log messages by receiving, by the at least one processor, via the communication interface, and from an administrative device, policy information. Additionally, the computing platform may, in response to determining the log message comprises policy information, remove the policy information from the log message. In some examples, the computing platform may perform the second analysis of the plurality of scrubbed log messages by receiving, by the at least one processor, via the communication interface, and from an administrative device, whitelist information. Additionally, the computing platform may, in response to determining the log message comprises whitelist information, parse the log message to determine sections containing the whitelist information and remove sections of the log message other than the sections containing the whitelist information.

In some embodiments, the computing platform may perform the second analysis of the plurality of scrubbed log messages by receiving, by the at least one processor, via the communication interface, and from an administrative device, criteria information. Further, the computing platform may, in response to determining the log message comprises the criteria information, replace the log message with a new log message. Additionally, the new log message may indicate a transaction identifier associated with the log message.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 8A-8E depict an example event sequence for scrubbing log files using scrubbing engines in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
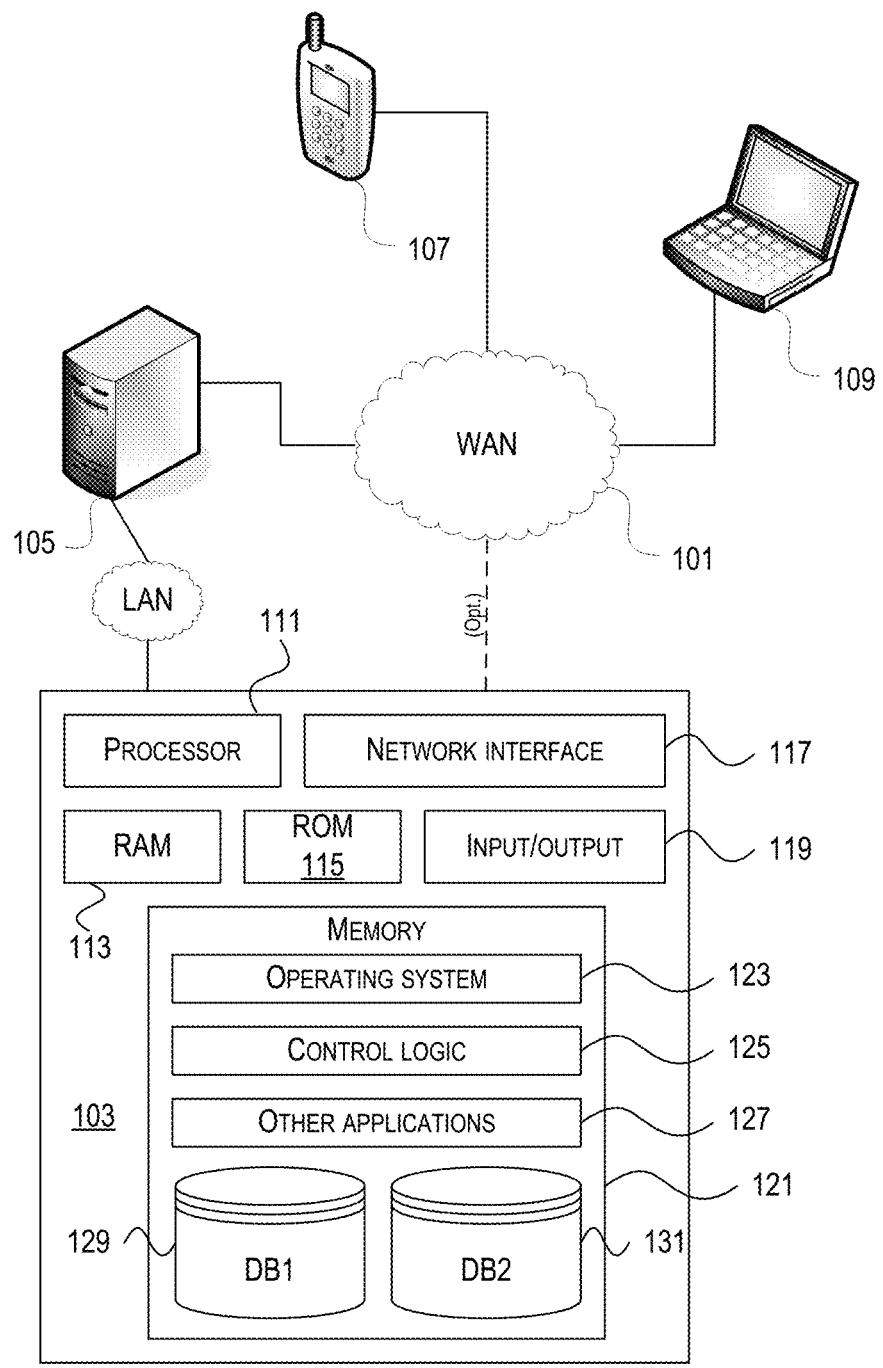
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
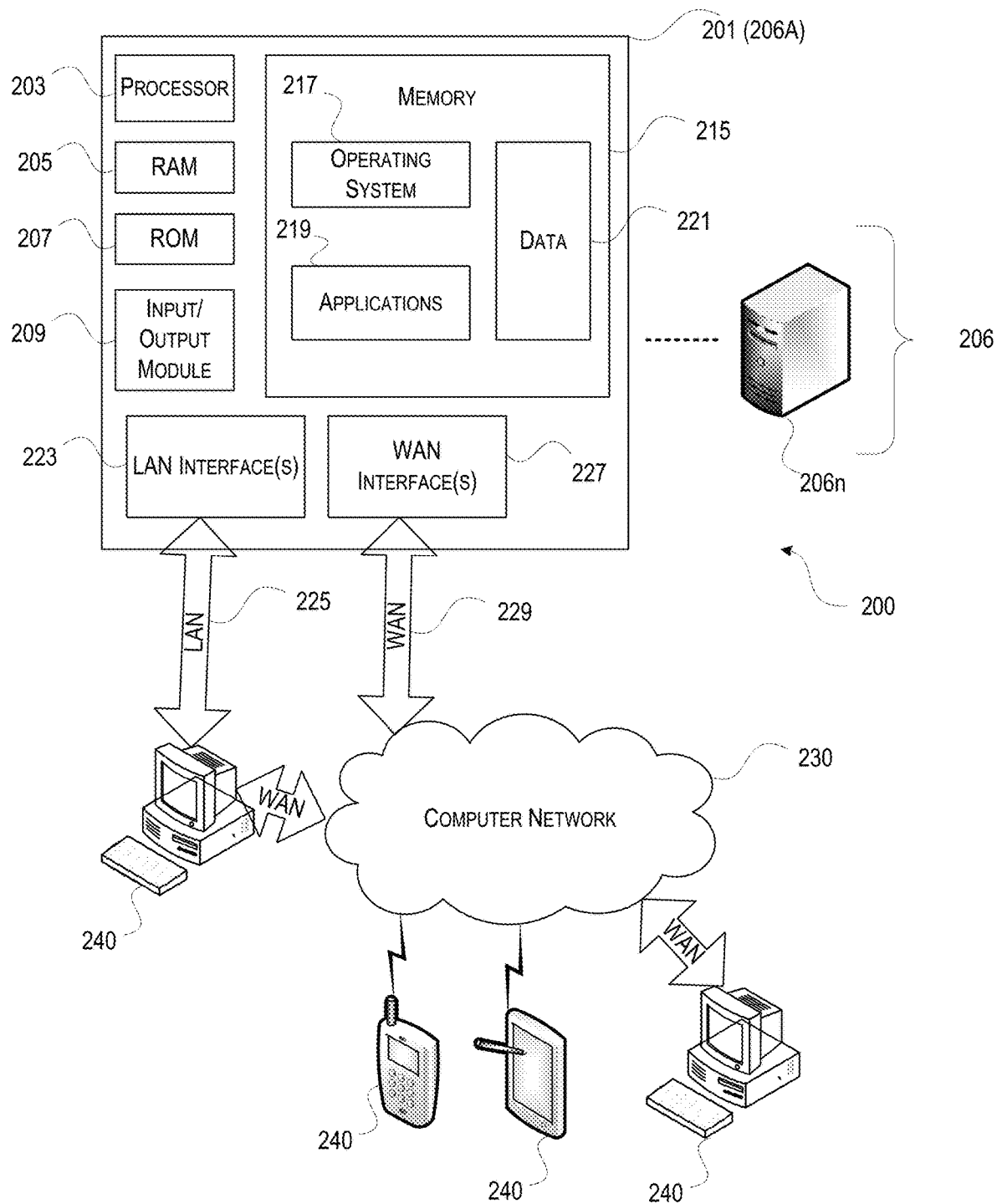
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
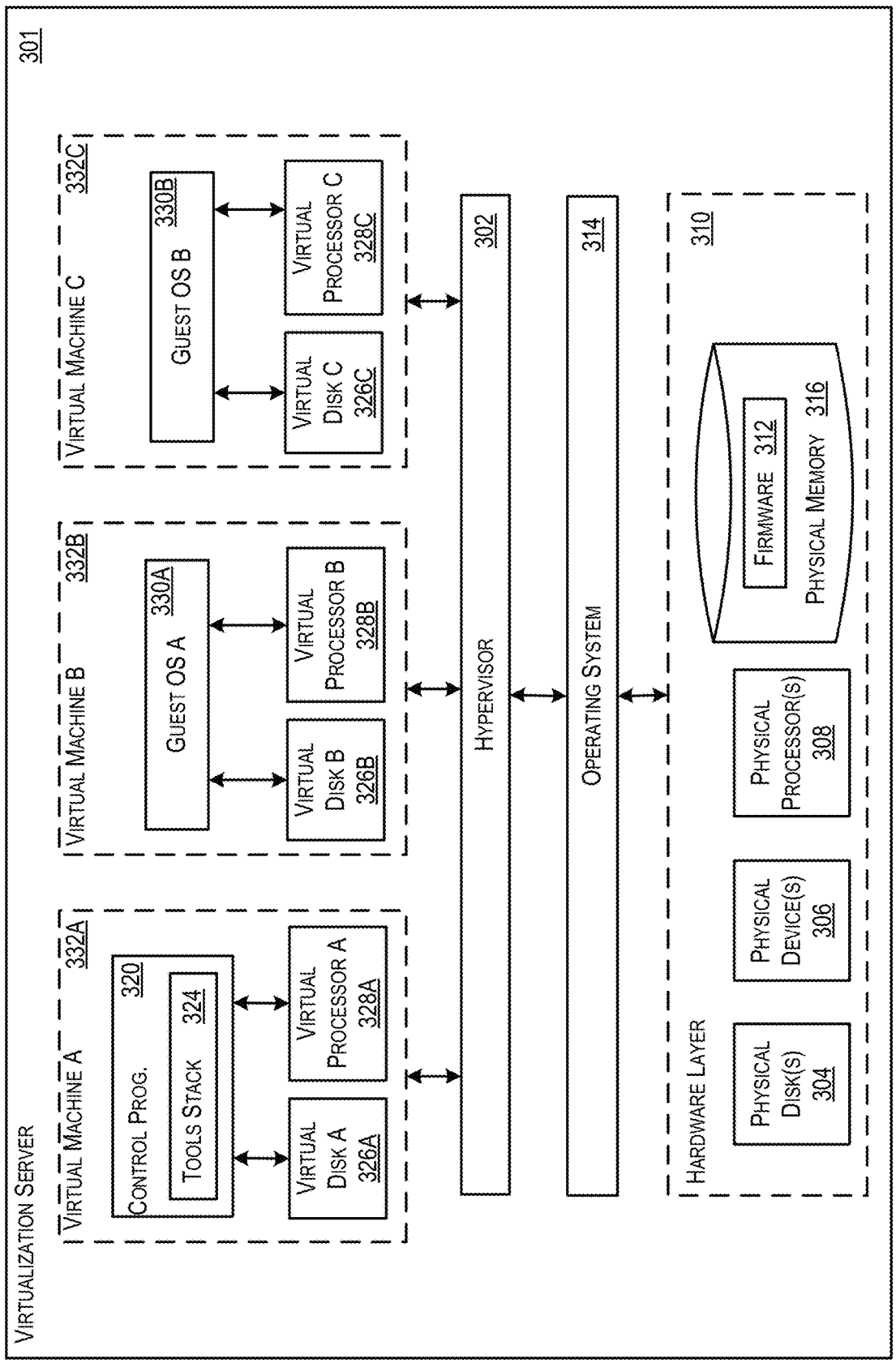
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
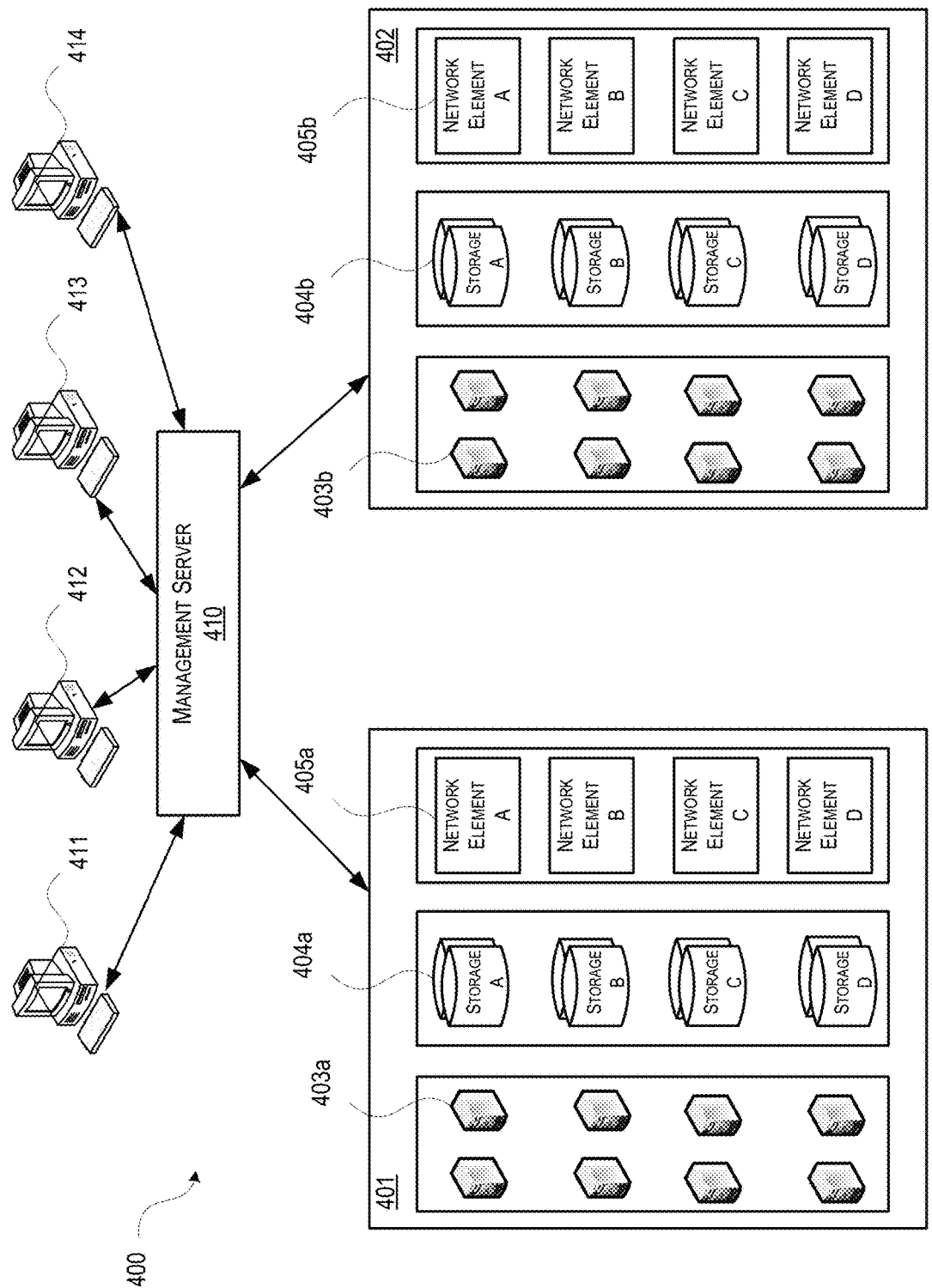
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network resources 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
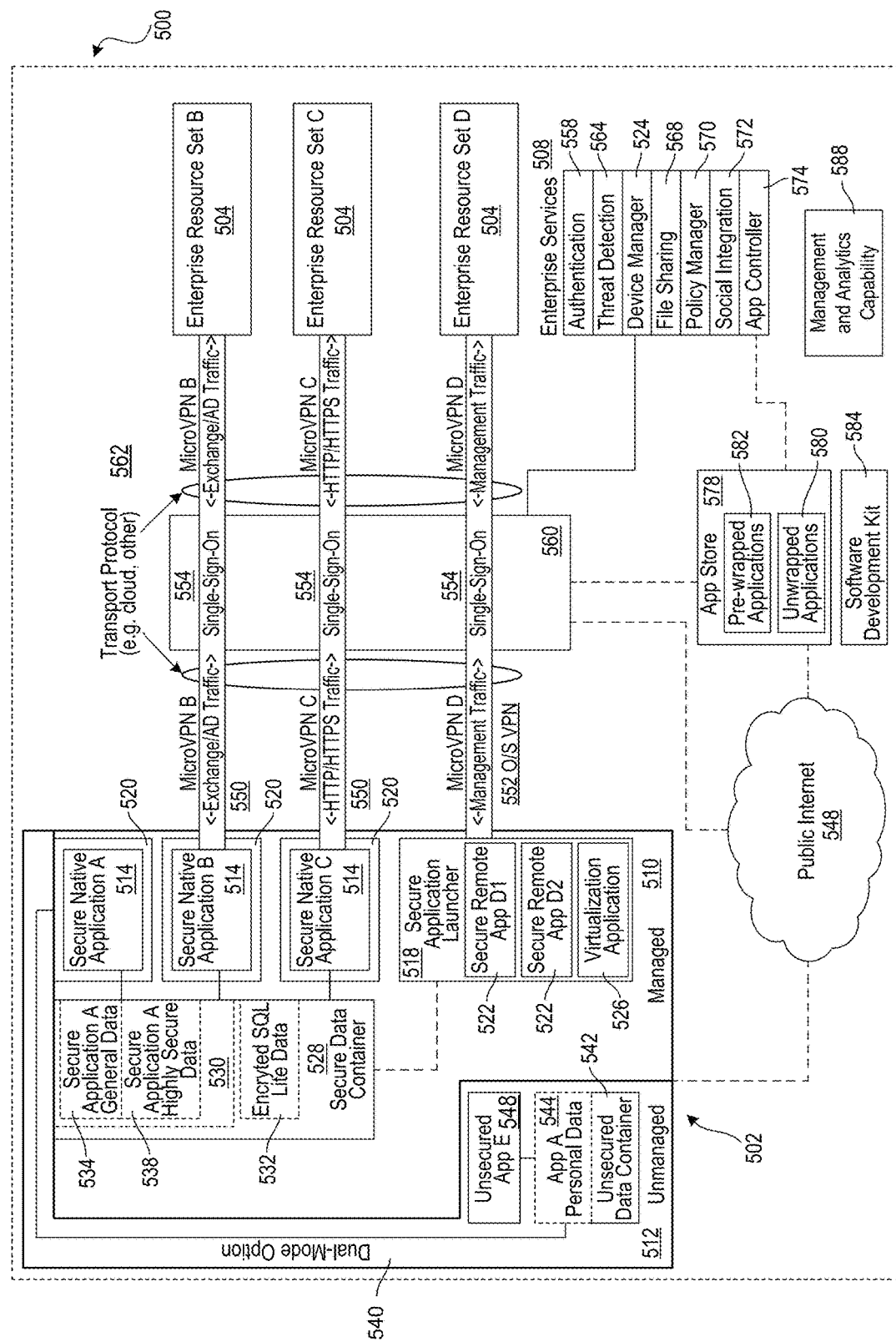
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is impenetrable by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications 550, particular devices, particular secured areas on the mobile device 552, and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
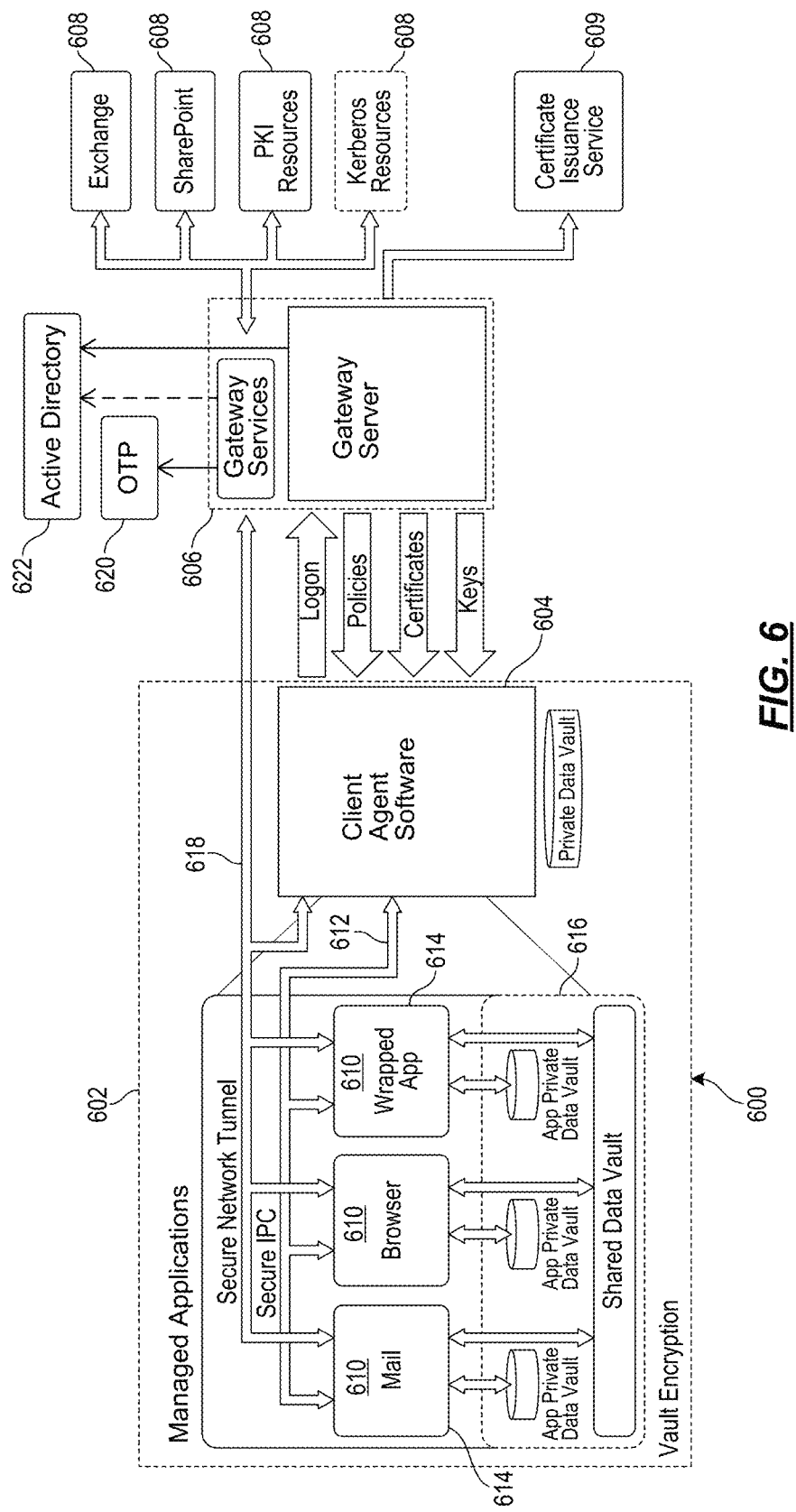
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PM) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PM protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PM protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PM protected resources.

The client agent 604 and the application management framework 614 may be enhanced to support obtaining and using client certificates for authentication to internal PM protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Scrubbing Log Files Using Scrubbing Engines

Figure 7:
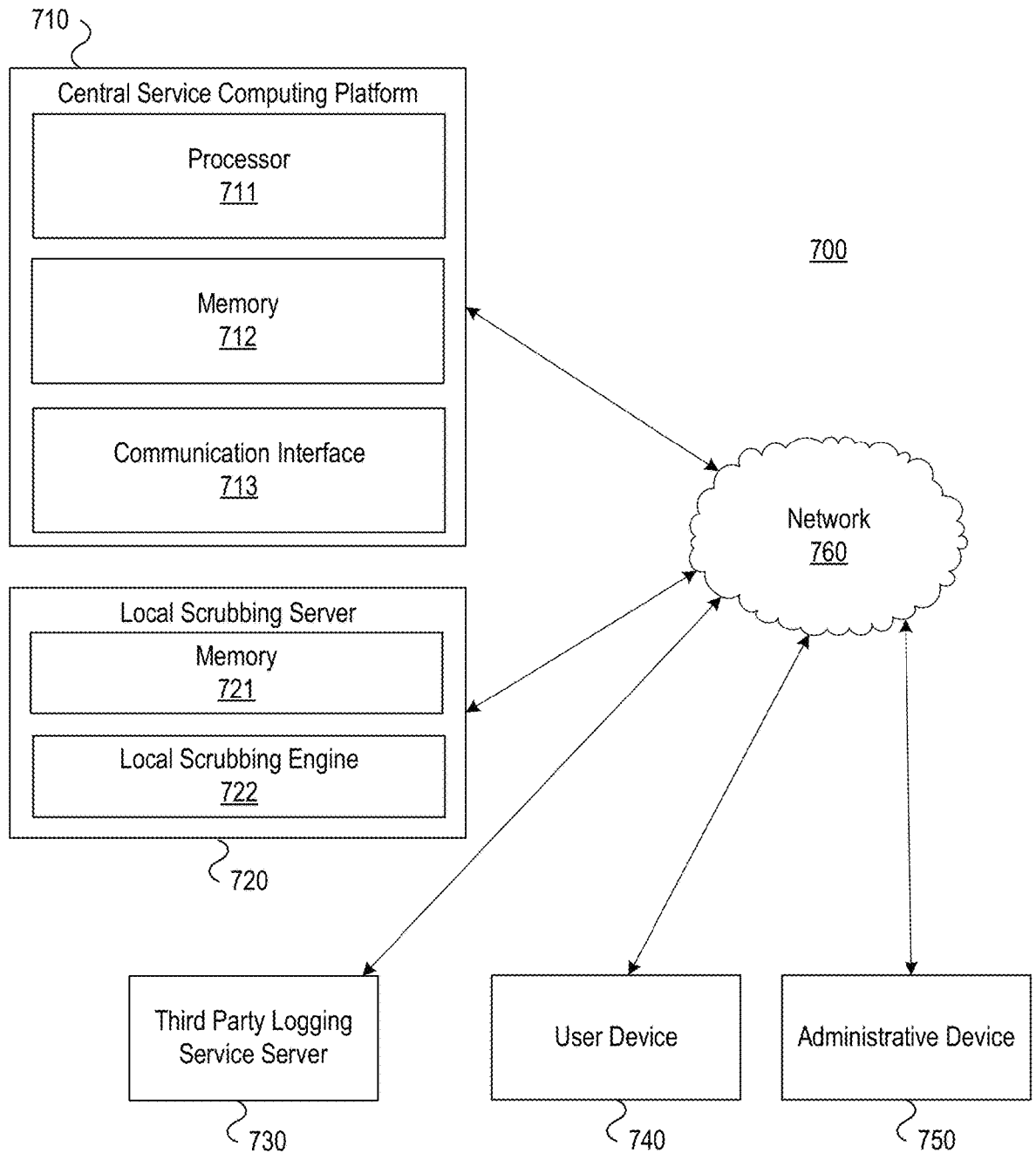
FIG. 7 depicts an illustrative computing environment for scrubbing log files using scrubbing engines in accordance with one or more illustrative aspects described herein.

FIG. 7 depicts an illustrative computing environment for scrubbing log files using scrubbing engines in accordance with one or more illustrative aspects described herein. Referring to FIG. 7, computing environment 700 may include a central service computing platform 710, a local scrubbing server 720, a third party logging service server 730, a user device 740, an administrative device 750, and a network 760. Central service computing platform 710, local scrubbing server 720, third party logging service server 730, user device 740, and administrative device 750 may include one or more physical components, such as one or more processors, memories, communication interfaces, and/or the like.

Central service computing platform 710 may include processor 711, memory 712, and communication interface 713. Processor 711 may execute instructions stored in the memory 712 to cause central service computing platform 710 to perform one or more functions, such as scrubbing log files using one or more scrubbing engines. Communication interface 713 may include one or more network interfaces via which central service computing platform 710 may communicate with one or more other systems and/or devices in computing environment 700, such as local scrubbing server 720, third party logging service server 730, user device 740, and administrative device 750.

Central service computing platform 710 may incorporate one or more aspects of cloud computing environment 400. For example, the central service computing platform 710 may include a management server, which may incorporate one or more aspects of management server 410. In addition, the central service computing platform 710 may provide one or more cloud zones, which may incorporate one or more aspects of the cloud zones 401 or 402 discussed above. Further, the central service computing platform 710 may include a scrubbing engine. The scrubbing engine, as explained in further detail below, may scrub one or more log files. Additionally, in some examples, the central service computing platform 710 aggregate log messages. For example, log messages may be received from multiple different software applications and/or software platforms. Further, computing environment 700 may include multiple local scrubbing servers 720. The central service computing platform 710 may receive log messages from multiple local scrubbing servers 720, software applications, and/or software platforms. After, the central service computing platform 710 may aggregate the received log messages based on the local scrubbing server 720 transmitting the log files. In some instances, after receiving the log files, the central service computing platform 710 may store the log files in the memory 712. For example, the central service computing platform memory 712 may include a network queue. The network queue may contain a multitude of log files from different software applications, local scrubbing servers 720, and/or software platforms.

Local scrubbing server 720 may include a memory 721 and a local scrubbing engine 722. The local scrubbing engine 722 may also include processors, memory, and/or communication interfaces. The local scrubbing engine's 722 processor may execute instructions stored in memory 721 to cause the local scrubbing server 720 to perform one or more functions, such as scrubbing log files using one or more scrubbing engines. Local scrubbing server's 720 communication interface may include one or more network interfaces via which local scrubbing server 720 may communicate with one or more other systems and/or devices in computing environment 700, such as central service computing platform 710, third party logging service server 730, user device 740, and administrative device 750. In some embodiments, the local scrubbing server 720 may be a common logging library that may be associated with an enterprise organization and/or a software application. Additionally, in some examples, the common logging library may be operated and/or managed by a cloud computing environment (e.g., cloud system) 400.

Computing environment 700 may include one or more local scrubbing servers 720. In some examples, each local scrubbing server 720 may receive data (e.g., log messages) from a multitude of user devices. For example, a multitude of user devices (e.g., user device 740) may transmit log messages. Each local scrubbing server 720 may receive log messages from one or more user devices 740. The memory 721 of the local scrubbing server 720 may store the log messages received from the user devices 740. In some instances, the local scrubbing server 720 may store the log messages in an in-memory queue as explained below.

Third party logging service server 730 may incorporate one or more aspects of web server 105 and/or data server 103. The central service computing platform 710 may scrub log files and/or messages using a scrubbing engine. Afterwards, the central service computing platform 710 may transmit the scrubbed log files and/or messages to the third party logging service server 730. In some examples, the third party logging service server 730 may be associated with a third party. The third party may be an organization not associated with the enterprise organization and the third party may receive and analyze the scrubbed log files for the enterprise organization.

User device 740 may be a mobile device 502 and/or a client device (e.g., client device 107). For example, from user device 740, a user may program and/or develop software applications. While developing and/or programming software applications, the user device 740 may generate log files. The user device 740 may transmit the log files to a local scrubbing server, such as local scrubbing server 720. An administrative device 750 may be associated with an enterprise organization and may send and receive information (e.g., policies, blacklist information, and/or whitelist information) to the other computing devices of computing environment 700.

In some instances, the user device 740 and/or administrative device 750 may be associated with an enterprise organization. For example, the user device 740 and/or administrative device 750 may be provided by the enterprise organization and/or a user's own user device based on a "Bring Your Own Device" (BYOD) model. The user device 740 and/or administrative device 750 may be accessing the network 760 using a network connection provided by the enterprise organization. In some examples, the user device 740 and/or administrative device 750 may be a virtual machine and/or may be operated on a cloud computing environment (e.g., cloud system) 400.

Network 760 may include one or more wide area networks and/or local area networks and may interconnect one or more systems and/or devices included in computing environment 700. For example, network 760 may interconnect central service computing platform 710, local scrubbing server 720, third party logging service server 730, user device 740, and administrative device 750.

Figure 8A:
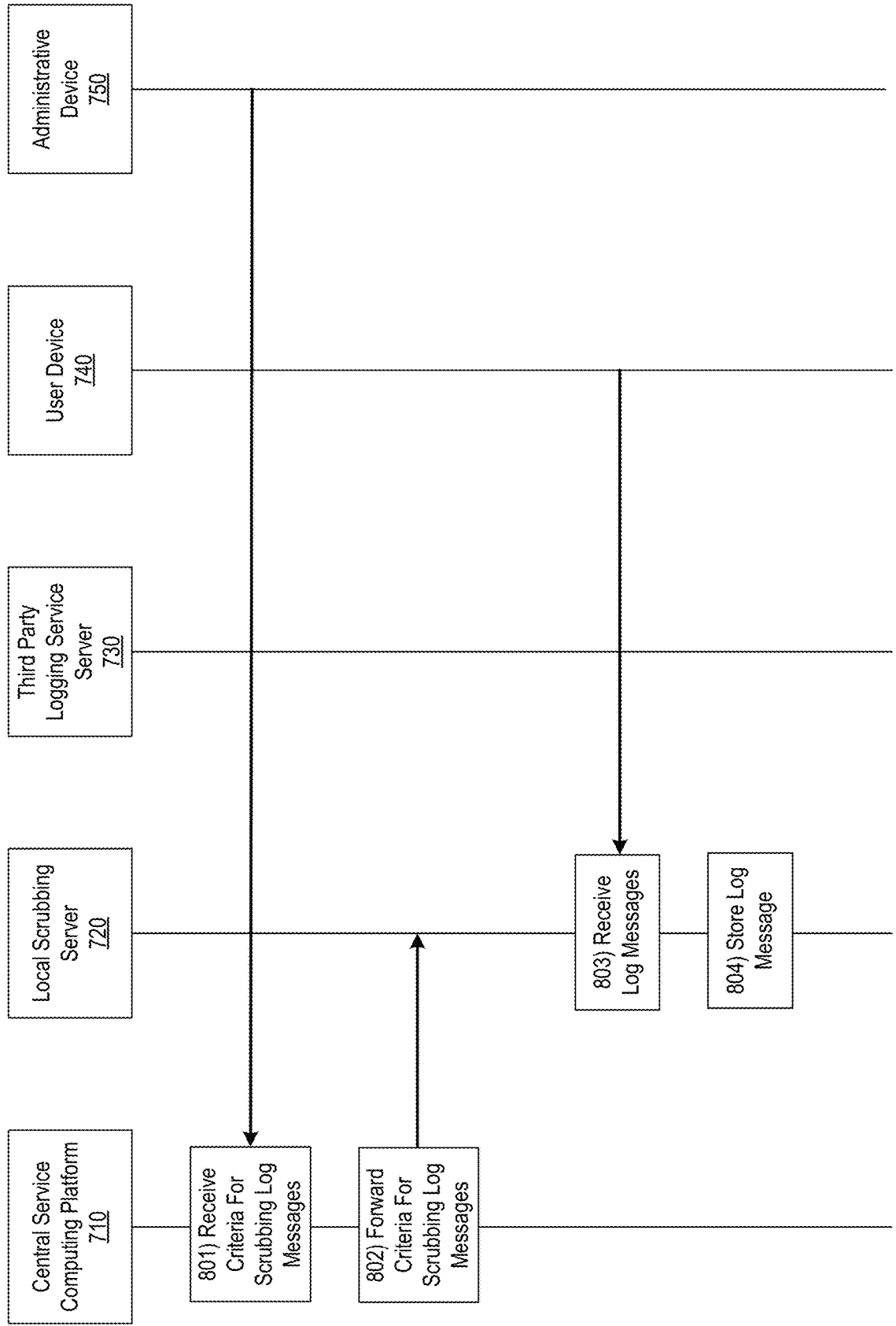
Figure 8C:
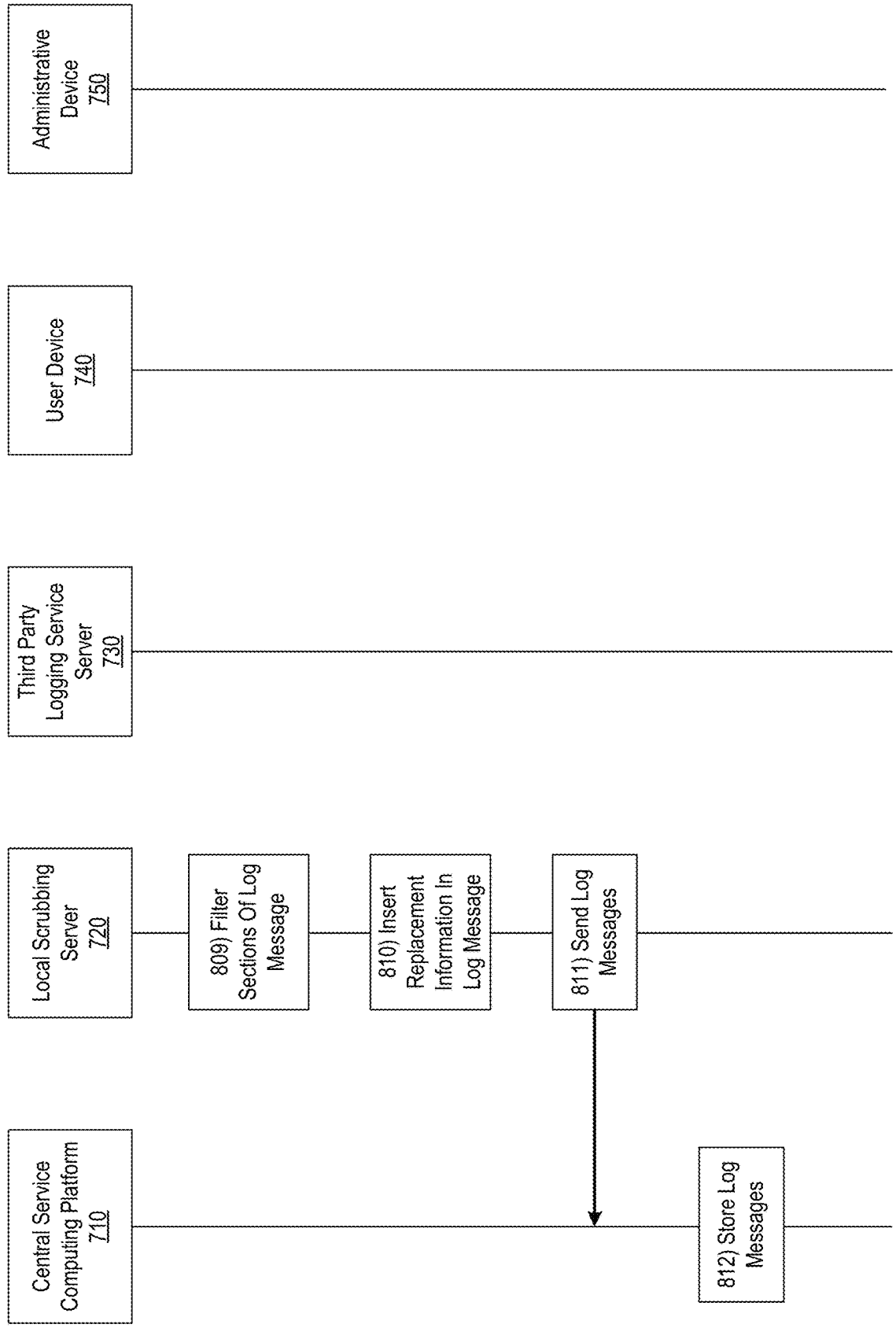
Figure 8E:
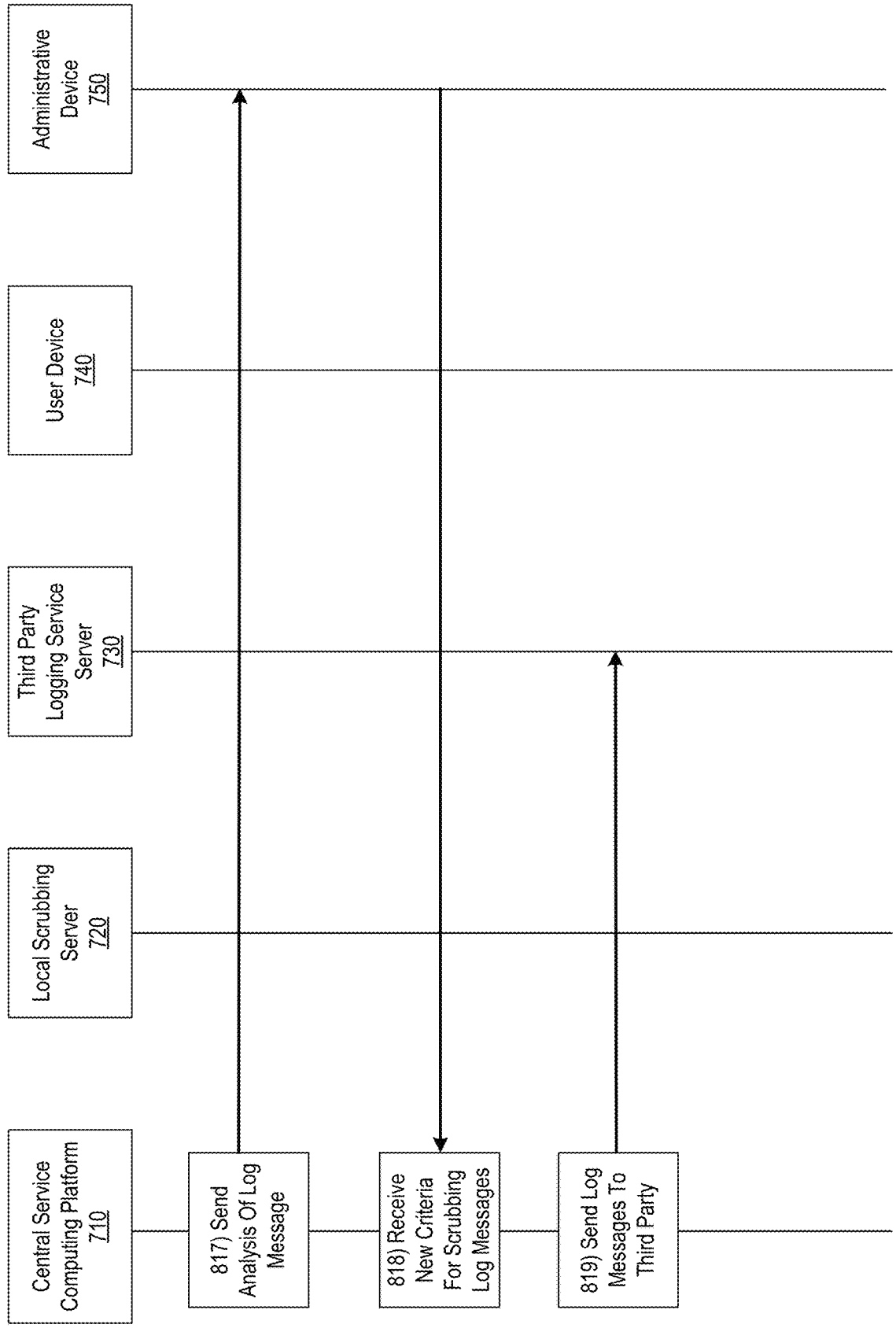

FIGS. 8A-8E depict an example event sequence for scrubbing log files using scrubbing engines in accordance with one or more illustrative aspects described herein. Referring to FIG. 8A, at step 801, a central service computing platform 710 may receive criteria information for scrubbing log messages and/or log files. For example, a log file may be a file that records events that occur in an operating system and/or a software application. Sensitive events, such as a user inputting a password and/or a login token, may be recorded and/or stored within a log file. An enterprise organization may seek to avoid transmitting log files comprising sensitive and/or confidential information (e.g., log files including user passwords, login tokens) to a third party. In such instances, an administrative device 750 associated with an organization may transmit criteria information (e.g., blacklist information, policy information, and/or whitelist information) to the central service computing platform 710. The central service computing platform 710, as explained below, may use the criteria information to scrub log files containing the sensitive information. In step 802, the central service computing platform 710 may forward the criteria information for scrubbing log messages to one or more local scrubbing servers 720. For example, computing environment 700 may include one or more local scrubbing servers (e.g., local scrubbing server 720). The central service computing platform 710 may forward the criteria information to the one or more local scrubbing servers 720. In some examples, the administrative device 750 may transmit the criteria information for scrubbing log messages directly to the local scrubbing server 720.

In step 803, a user device 740 may transmit a log message to a local scrubbing servers 720. For example, the user device 740 may be processing an application programmable interface (API) request. The user device 740 may generate and/or record log files and/or log messages documenting events associated with processing the request. After generating the log message, the user device 740 may transmit the log message to a local scrubbing server 720.

In some examples, the log files may include sensitive and/or confidential information. For example, the enterprise organization may require a password or other login credentials to access the enterprise organization's assets. A user, using a user device 740, may input the password and/or other login credentials to access the enterprise organization's assets. The user device 740 may generate a log message and/or log file documenting and/or recording the event. In addition, the user device 740 may include the password and/or other login credentials in the generated log message. In some instances, the log files may include identification information associated with the log file. For example, the identification information may be used to identify the user device 740 that generated the log file, the calling method name, the transaction identifier, the user or client accessing the enterprise resources, and/or other identification information to identify or distinguish the log file. In some examples, the local scrubbing server 720 may determine, from the log file and/or the user device 740, the identification information. For example, the local scrubbing server 720 may monitor the user device 740. As the user device 740 is generating the log file, the local scrubbing server 720 may monitor the user device 740 to determine the identification information (e.g., the calling method name, the transaction identifier). Then, the local scrubbing server 720 may associate the identification information with the generated log file.

After receiving the log files and/or messages, the local scrubbing server 720, in step 804, may store the log messages. For example, the local scrubbing server 720 may store the log messages in the local scrubbing server memory 721, which may comprise a queue, such as an in-memory queue. The in-memory queue may contain a sequence of log messages with a head end (e.g., longest stored log message) and a tail end (e.g., most recently stored log message). As new log messages are received, the local scrubbing server 720 may continuously store the new log messages at the tail end (e.g., most recently stored log message) of the queue.

In some embodiments, the local scrubbing server 720 may determine the resources allocated to the in-memory queue are exhausted. For example, the local scrubbing server 720 may receive more log messages than it can process. The local scrubbing server 720 may continue to store the log messages until the memory 721 is near capacity. After determining the resources are exhausted, the local scrubbing server 720 may clear a number of the log messages in the in-memory queue and replace the cleared log messages with a single log message. The single log message may be a log message stating, "resources exhausted, dropped N log messages." The number of log messages to be cleared may be based on the amount of log messages received in a pre-determined time window versus the amount of log messages processed in the pre-determined time window. Additionally, and/or alternatively, the local scrubbing server 720 may clear all log messages of the in-memory queue and replace them with a single log message stating, "resources exhausted, dropped all log messages."

In step 805, the local scrubbing server 720 may retrieve, from the in-memory queue, a log message. The local scrubbing server 720 may retrieve the log message at the head end (e.g., longest stored log message) of the in-memory queue. Therefore, the local scrubbing server 720 may process the log messages in a sequential order based on the time the log message was received. After, and as described in the steps below, the local scrubbing server 720 may analyze the retrieved log message to determine whether the log message includes sensitive and/or confidential information.

In some instances, local scrubbing server 720 may use two or more separate processes to perform the steps above. For example, using one thread of execution, software application, and/or processor, the local scrubbing server 720 may receive and/or store the log messages at the tail end of the in-memory queue. Additionally, using another thread of execution, application, and/or processor, the local scrubbing server 720 may retrieve and/or analyze the log messages at the head end of the in-memory queue. In such instances, the local scrubbing server 720 may perform the receiving, storing, retrieving, and/or analyzing the log messages substantially simultaneously.

In some embodiments, the local scrubbing server 720 and user device 740 may be implemented in the same cloud computing environment 400. When the user device 740 generates or writes a log message, the local scrubbing server 720 may capture the log message and/or the calling method name using one thread of execution and/or application. Then, the local scrubbing server 720 may store the log message and/or calling method name in the in-memory queue and may return the thread of execution back to the user device 740. Using another thread of execution, the local scrubbing server 720 may retrieve and/or analyze log messages and/or calling method names using another thread of execution and/or application.

In step 806, the local scrubbing server 720 may analyze the log message by comparing the log message with blacklist criteria information. For example, after retrieving the log message in step 805, the local scrubbing server 720 may parse through the log message and determine whether the log message includes blacklist criteria information. As mentioned previously in step 801, the local scrubbing server 720 may receive the criteria information, such as blacklist criteria information, from the central service computing platform 710 and/or the administrative device 750. The blacklist criteria information may indicate keywords and/or key phrases to be scrubbed from the log messages. For example, the local scrubbing server 720 may parse through the log message to determine keywords and/or key phrases indicated by the blacklist criteria information. In some instances, the log messages might not include any blacklist criteria information. In other instances, the log messages may include multiple different prohibited keywords and/or key phrases.

In step 807, the local scrubbing server 720 may analyze the log message by comparing the log message with policy information. For example, after retrieving the log message in step 805, the local scrubbing server 720 may parse through the log message and determine whether the log message includes policy information. As mentioned previously in step 801, the local scrubbing server 720 may receive the criteria information, such as policy information, from the central service computing platform 710 and/or the administrative device 750. The policy information may include policy files that control user access levels and/or session environments by controlling connection, security, and/or bandwidth settings. For example, the policy file may include instructions to "scrub all log messages that contain the words 'secret' and 'key'." The local scrubbing server 720 may parse through the log message to determine whether the log message includes the policy information (e.g., "secret" and "key"). In some instances, the policy information may indicate a privacy level associated with a customer of the enterprise organization. For example, the local scrubbing server 720 may scrub the log files based on the privacy level and/or the sensitivity of the information within the log files. Some subjects may be less sensitive or confidential than other subjects. The local scrubbing server 720 may scrub less sensitive subjects from the log files if the privacy level associated with the customer is high. But, additionally and/or alternatively, the local scrubbing server 720 might not scrub less sensitive subjects from the log files if the privacy level associated with the customer is low. In some embodiments, the policy information may be stored within a server (e.g., gateway server 606) associated with an enterprise organization. The central service computing platform 710 and/or the local scrubbing server 720 may request the policy information from the server storing the policy information.

In step 808, the local scrubbing server 720 may analyze the log message by comparing the log message with whitelist criteria information. For example, after retrieving the log message in step 805, the local scrubbing server 720 may parse through the log message and determine whether the log message includes whitelist criteria information. As mentioned previously in step 801, the local scrubbing server 720 may receive the criteria information, such as whitelist criteria information, from the central service computing platform 710 and/or the administrative device 750. The whitelist criteria information may indicate information allowed in the log messages by the enterprise organization. For example, the local scrubbing server 720 may parse through the log message to determine words, phrases, sentences, and/or subjects indicating whitelist criteria information. In some instances, the log messages might not include any whitelist criteria information. In other instances, the log messages may include multiple different allowable words, phrases, sentences, and/or subjects.

In step 809, the local scrubbing server 720 may filter and/or scrub parts and/or sections of the log message based on the criteria information. For example, based on determining whether the log message includes blacklist criteria information, policy information, and/or whitelist criteria information, the local scrubbing server 720 may remove and/or filter parts and/or sections of the log message. In some examples, the log message may contain blacklist criteria information. The local scrubbing server 720 may scrub and/or filter the parts and/or sections of the log message that includes the blacklist criteria information. In some instances, based on the policy information associated with the enterprise organization, the local scrubbing server 720 may scrub and/or filter parts and/or sections of the log message. For example, the local scrubbing server 720 may scrub the log messages containing words identified in the policy information (e.g., "secret" and "key"). In some instances, the local scrubbing server 720 may might not scrub the log message when it detects one or zero words (e.g., "secret") identified in the policy information. In some embodiments, the log message may contain whitelist criteria information. The local scrubbing server 720 may keep the allowable parts and/or sections associated with the whitelist criteria information and may further scrub and/or filter the other parts and/or sections of the log message.

In some examples, the local scrubbing server 720 may scrub log files based on the deployment environment associated with the log files. The deployment environment may be an environment where the software application is deployed and/or executed. For example, the policy information may include an instruction to scrub the log files based on the deployment environment (e.g., a production environment or a development environment). Based on the policy information, the local scrubbing server 720 may determine and scrub the log files based on whether the log files are from the production environment or the development environment.

In some embodiments, the local scrubbing server 720 may scrub log messages based on the customer generating the log file. For example, user device 740 may be associated with a customer of the enterprise organization. The policy file may indicate a privacy level associated with each customer of the enterprise organization. Based on the privacy level and/or the sensitive or confidential information in the log files, the local scrubbing server 720 may scrub keywords and/or subjects from the log files. In some examples, the local scrubbing server 720 may receive a request to change the privacy level of the customer. For example, the customer may require assistance debugging an issue and may transmit a request, via the user device 740, to change the privacy level associated with scrubbing the log files. The local scrubbing server 720, based on the privacy level, might not scrub some sensitive information in the log files to allow the enterprise organization to assist in debugging the issue. After determining the source of the issue and/or after a period of time, the local scrubbing server 720 may receive a further request to change the privacy level back to the original privacy level associated with the customer.

In step 810, the local scrubbing server 720 may insert replacement information in the log message. For example, after the local scrubbing server 720 scrubs and/or filters parts and/or sections of the log message based on the criteria information, the local scrubbing server 720 may insert replacement information into the log message. The replacement information may include the keyword or key phrase that was detected (e.g., password information detected), reason the section and/or part of the log message was scrubbed or filtered (e.g., blacklist criteria information, whitelist criteria information, and/or policy information), and/or identification information associated with the log file (e.g., calling method name) In some examples, rather than scrubbing and/or filtering the parts and sections of the log message, the local scrubbing server 720 may replace the original log message with a new log message. The new log message may include the keyword or key phrase that was detected, reason the section and/or part of the log message was scrubbed or filtered, and/or identification information associated with the log file.

In step 811, the local scrubbing server 720 may send log messages to the central service computing platform 710. For example, the central service computing platform 710 may receive, via the communication interface 713, log messages from the local scrubbing server 720. In some instances, after altering the log message in steps 809 and 810, the local scrubbing server 720 may transmit the scrubbed log messages to the central service computing platform 710. In some embodiments, the central service computing platform 710 may receive log messages from multiple local scrubbing servers 720. Each local scrubbing server 720 may scrub log messages and may transmit the scrubbed log messages to the central service computing platform 710.

In step 812, the central service computing platform 710 may store the log messages in memory (e.g., the central service computing platform memory 712). For example, the central service computing platform 710 may store the log messages in a network queue within the memory 712. In some embodiments, the network queue may function similar to the in-memory queue described above. For example, the network queue may include a top (e.g., head end) of the network queue and a bottom (e.g., tail end) of the network queue. The central service computing platform 710 may store newly received log messages at the bottom (e.g., tail end) of the network queue and may retrieve log messages at the top (e.g., head end) of the network queue. In some instances, the central service computing platform 710 may be implemented in a cloud computing environment (e.g., cloud system) 400. As the central service computing platform memory 712 becomes exhausted, the central service computing platform 710 may continuously assign more cloud resources (e.g., cloud zones 401 and/or 402) of the cloud computing environment 400 to processing and/or storing log messages. In step 813, the central service computing platform 710 may retrieve log messages from the central service computing platform memory 712. For example, the central service computing platform 710 may retrieve the scrubbed log message from the head end of the network queue.

After retrieving the log message, in step 814, the central service computing platform 710 may perform a second analysis of the log message to determine whether to scrub the new log message. For example, using the criteria information received in step 801 (e.g., blacklist information, policy information, and/or whitelist information), the central service computing platform 710 may perform an addition scrubbing of the log message. In some examples, the scrubbing performed by the central service computing platform 710 may be different than the scrubbing performed by the local scrubbing server 720. For example, the central service computing platform 710 may receive updated criteria information more frequently than the local scrubbing server 720. Additionally, and/or alternatively, the enterprise organization may flag a new type of log message to be scrubbed. Rather than transmitting the criteria information indicating the new type of log message to each local scrubbing server 720, which may take some time, the administrative device 750 may transmit the new criteria information to the central service computing platform 710. Since the central service computing platform 710 may receive the log messages from each of the local scrubbing servers 720, the central service computing platform 710 may perform a second analysis to scrub the log messages based on the new criteria information.

In some instances, the central service computing platform 710 and the local scrubbing server 720 may scrub the log messages based on different criteria information. For example, the central service computing platform 710 may scrub log messages based on enterprise specific criteria information (e.g., policy information) and the local scrubbing server 720 may scrub log messages based on general criteria information (e.g., blacklist information).

In step 815, the central service computing platform 710, based on the determination in step 814, may replace the new log message with additional information. The additional information may be similar to the replacement information described above. For example, the additional information may include the keyword or key phrase that was detected, reason the section and/or part of the log message was scrubbed or filtered, and/or identification information associated with the log file. In some embodiments, the central service computing platform 710 may remove the log message, and may replace the log message with a unique transaction identifier associated with the log message.

In step 816, the central service computing platform 710 may determine the status of the log message. For example, the central service computing platform 710 may determine whether the log message was scrubbed and/or filtered by the local scrubbing server 720 and/or by the central service computing platform 710. Additionally, and/or alternatively, the central service computing platform 710 may determine the replacement information and/or the additional information associated with the log message (e.g., the keyword or key phrase that was detected in the log message, the reason the section and/or part of the log message was scrubbed or filtered, the identification information, and/or the transaction identifier). Based on the determination, the central service computing platform 710 may send the log message and/or replacement information to the administrative device 750 and/or the third party logging service server 730.

In step 817, the central service computing platform 710 may send, via the communication interface 713, the analysis of the log message to the administrative device 750. For example, based on the analysis by the local scrubbing server 720, the central service computing platform 710, and/or the determination of the status of the log message in step 816, the central service computing platform 710 may send the analysis to the administrative device 750 associated with the enterprise organization. The enterprise organization associated with the administrative device 750 may use the log message, additional information, and/or replacement information to determine new criteria information. For example, the enterprise organization may determine that the log files, including the source of the log files, are recording new sensitive and/or confidential information. The enterprise organization may determine new criteria information based on the new sensitive and/or confidential information. In some examples, the enterprise organization, based on the replacement information and/or log message, may prevent the application software from generating log files containing the sensitive and/or confidential information. After determining the new criteria information, in step 818, the central service computing platform 710 may receive, via the communication interface 713, the new criteria information from the administrative device 750. The new criteria information may be used to scrub new log messages.

In step 819, the central service computing platform 710 may send, via the communication interface 713, the log messages to the third party logging service server 730. For example, the central service computing platform 710 may send the log messages, including the log messages scrubbed by the local scrubbing server 720 and/or the central service computing platform 710, to a third party. The third party might not be associated with the enterprise organization and may analyze the log messages for the enterprise organization. After scrubbing the log messages, the third party might not receive any log messages with sensitive and/or confidential information associated with the enterprise organization.

Figure 9:
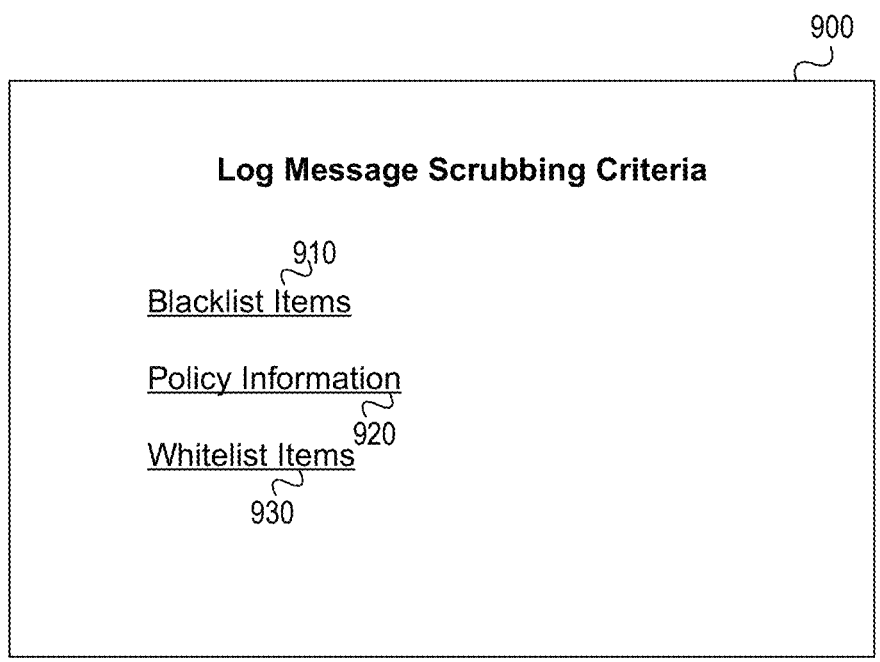
FIG. 9 depicts an example graphical user interface for scrubbing log files using scrubbing engines in accordance with one or more illustrative aspects described herein.

FIG. 9 depicts an example graphical user interface for scrubbing log files using scrubbing engines in accordance with one or more illustrative aspects described herein. Referring to FIG. 9, the display screen 900 may be a display screen of the administrative device 750. A user, using the administrative device 750, may set the criteria information used by the local scrubbing server 720 and/or the central service computing platform 710 to scrub the log files. For example, the user may set blacklist items 910, policy information 920, and/or whitelist items 930 as described above. The local scrubbing server 720 and/or the central service computing platform 710 may use the user set criteria information to scrub the log files as described above.

Figure 10:
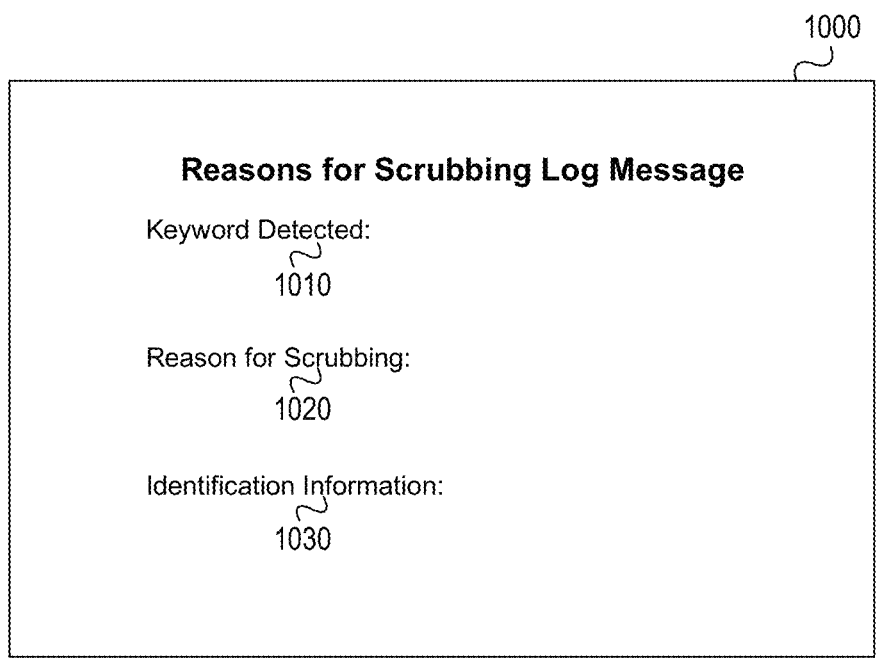
FIG. 10 depicts another example graphical user interface for scrubbing log files using scrubbing engines in accordance with one or more illustrative aspects described herein.

FIG. 10 depicts another example graphical user interface for scrubbing log files using scrubbing engines in accordance with one or more illustrative aspects described herein. Referring to FIG. 10, the display screen 1000 may be a display screen of the administrative device 750. A user, using the administrative device 750, may determine the reasons the local scrubbing server 720 and/or the central service computing platform 710 scrubbed the associated log file. For example, the display screen 1000 may display the keyword detected 1010, the reason for scrubbing the log file 1020, and/or the identification information 1030 as described above.

Figure 11:
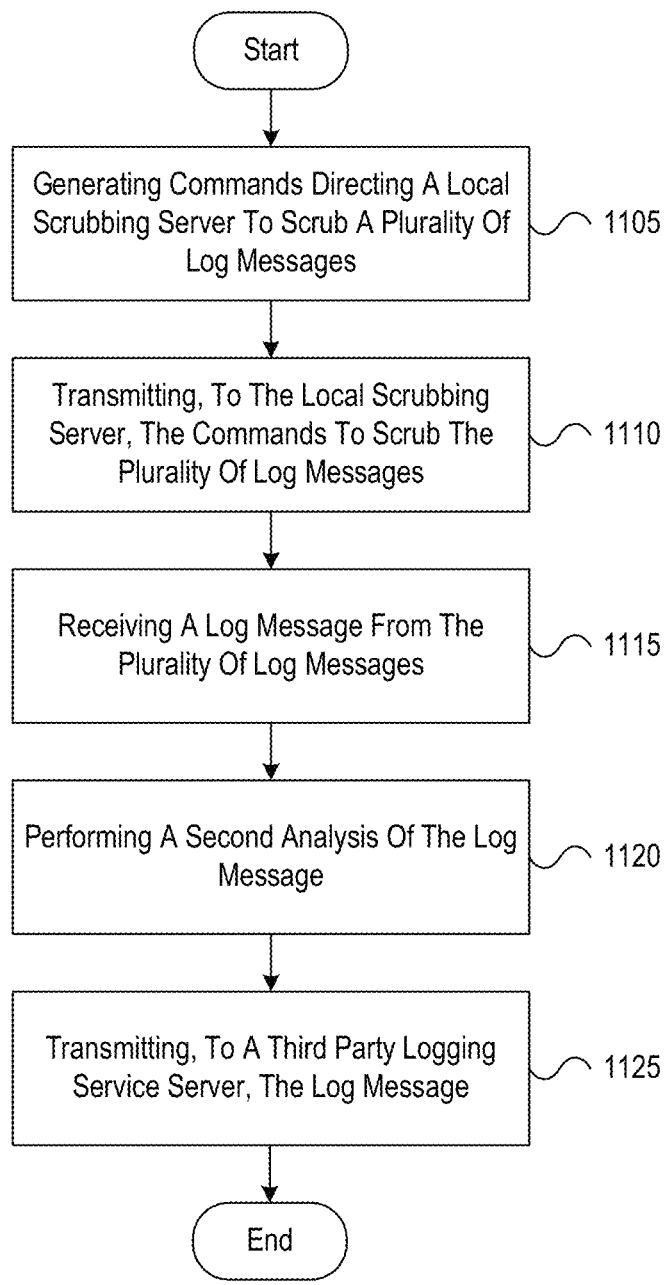
FIG. 11 depicts an example method of scrubbing log files using scrubbing engines in accordance with one or more illustrative aspects described herein.

FIG. 11 depicts an example method of scrubbing log files using scrubbing engines in accordance with one or more illustrative aspects described herein. Referring to FIG. 11, at step 1105, a central service computing platform having at least one processor, a communication interface, and a memory may generate one or more commands directing a local scrubbing server to scrub a plurality of log messages. At step 1110, the central service computing platform may transmit, to the local scrubbing server, the one or more commands directing the local scrubbing server to scrub the plurality of log messages. At step 1115, the central service computing platform may receive, from the local scrubbing server, a log message from the plurality of log messages, wherein the log message was scrubbed by the local scrubbing server. At step 1120, the central service computing platform may perform a second analysis of the log message. At step 1125, the central service computing platform may transmit, to a third party logging service server and based on the second analysis, the log message.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving, by a computing device and from one or more mobile devices, a plurality of log messages, the one or more mobile devices and the computing device being associated with an organization;
   determining, by the computing device and based on detecting a plurality of keywords within a received log message of the plurality of log messages, that the received log message comprises first sensitive information corresponding to a first keyword and second sensitive information corresponding to a second keyword;
   in response to the determining that the received log message comprises the first sensitive information and the second sensitive information, replacing, by the computing device, the first sensitive information with first replacement information and the second sensitive information with second replacement information, wherein the first replacement information comprises a reason, for replacing the first sensitive information, indicating that the first keyword is associated with general criteria information, wherein the second replacement information comprises a reason, for replacing the second sensitive information, indicating that the second keyword is specific to a policy of the organization, and wherein the first and second replacement information comprises one or more detected keywords and a unique identifier of a log service that generated the received log message; and
   preventing, by the computing device and based on the replacing, transfer of the first sensitive information and the second sensitive information to a device outside the organization.

2. The method of claim 1, further comprising:
   retrieving a second log message from an in-memory queue storing the plurality of log messages; and
   in response to determining that the second log message comprises criteria information, removing one or more parts, of the second log message, that include the criteria information.

3. The method of claim 2, further comprising:
   in response to receiving the second log message, storing, using a first thread of execution, the second log message at a tail end of the in-memory queue, wherein the in-memory queue comprises the tail end and a head end, and wherein the second log message moves from the tail end to the head end as new log messages are received by the computing device; and
   wherein the retrieving the second log message from the in-memory queue comprises retrieving, using a second thread of execution, the second log message from the head end of the in-memory queue.

4. The method of claim 2, further comprising inserting, into the second log message, the criteria information and identification information associated with the second log message.

5. The method of claim 2, further comprising:
   in response to determining memory resources of the in-memory queue are exhausted, replacing the second log message with a new log message indicating that the memory resources of the in-memory queue are exhausted.

6. The method of claim 1, further comprising:
   receiving, from an administrative device, blacklist information; and wherein the determining that the received log message comprises the first sensitive information and the second sensitive information is based on determining that the received log message comprises the blacklist information.

7. The method of claim 1, further comprising:
receiving, from an administrative device, whitelist information; and
wherein the determining that the received log message comprises the first sensitive information and the second sensitive information is based on determining that the received log message comprises information other than the whitelist information.

8. The method of claim 1, further comprising inserting, by the computing device and into the received log message, the unique identifier of the log service that generated the received log message.

9. The method of claim 1, further comprising:
preventing, based on the received log message, the log service from generating additional log messages that comprise sensitive information corresponding to the first keyword and sensitive information corresponding to the second keyword.

10. The method of claim 1, further comprising:
based on detecting a third keyword within a second received log message of the plurality of log messages, generating a new message, wherein the second received log message was generated by a second service different from the log service;
inserting, into the new message, the detected third keyword and an identifier of the second service; and
replacing the second received log message with the new message.

11. The method of claim 1, further comprising inserting, by the computing device and into the received log message, a transaction identifier associated with the received log message.

12. A computing device comprising:
one or more processors; and
memory storing instructions that, when executed by the one or more processors, cause the computing device to:
receive, from one or more mobile devices, a plurality of log messages, the one or more mobile devices and the computing device being associated with an organization;
determine, based on detecting a plurality of keywords within a received log message of the plurality of log messages, that the received log message comprises first sensitive information corresponding to a first keyword and second sensitive information corresponding to a second keyword;
in response to the determining that the received log message comprises the first sensitive information and the second sensitive information, replace the first sensitive information with first replacement information and the second sensitive information with second replacement information, wherein the first replacement information comprises a reason, for replacing the first sensitive information, indicating that the first keyword is associated with general criteria information, wherein the second replacement information comprises a reason, for replacing the second sensitive information, indicating that the second keyword is specific to a policy of the organization, and wherein the first and second replacement information comprises one or more detected keywords and a unique identifier of a log service that generated the received log message; and
prevent, based on the replacing, transfer of the first sensitive information and the second sensitive information to a device outside the organization.

13. The computing device of claim 12, wherein the instructions, when executed by the one or more processors, further cause the computing device to insert, into the received log message, the unique identifier of the log service that generated the received log message.

14. The computing device of claim 12, wherein the instructions, when executed by the one or more processors, further cause the computing device to cause preventing, based on the received log message, the log service from generating additional log messages that comprise sensitive information corresponding to the first keyword and sensitive information corresponding to the second keyword.

15. The computing device of claim 12, wherein the instructions, when executed by the one or more processors, further cause the computing device to insert, into the received log message, a transaction identifier associated with the received log message.

16. The method of claim 1, wherein the first replacement information comprises the first keyword and an indication that the first keyword is associated with blacklist information, and wherein the second replacement information comprises the second keyword and an indication that the second keyword is associated with policy information.

17. A method comprising:
receiving, by a computing device, a log message from a user device, the log message being generated by the user device as part of a thread of execution to process an application programmable interface (API) request on the user device, wherein receipt of the log message transfers the thread of execution from the user device to the computing device;
returning, by the computing device, the thread of execution back to the user device to complete processing of the API request on the user device in response to storage of the received log message within memory of the computing device;
identifying, by the computing device, sensitive content of the received log message in response to storage of the received log message, the identification of the sensitive content being part of a different thread of execution to process log messages on the computing device than the thread of execution to process the API request on the user device; and
providing, by the computing device, another log message different from the received log message to a third-party device so as to prevent leakage of the sensitive content during communication of one or more log messages to third-party devices, wherein the other log message comprises a unique identifier of a log service that generated the received log message.

18. The method of claim 17, further comprising:
preventing, based on the other log message, the log service that generated the received log message from generating additional log messages that comprise the sensitive content.

19. The method of claim 1, further comprising:
causing display, via a graphical user interface, of one or more of the reason for replacing the first sensitive information, the reason for replacing the second sensitive information, the one or more detected keywords, or the unique identifier of the log service that generated the received log message.

20. The method of claim 17, wherein the other log message comprises replacement information including one or more detected keywords and one or more reasons that the received log message was filtered.

\* \* \* \* \*